(12) United States Patent
LaBrousse et al.

(10) Patent No.: US 8,147,969 B2
(45) Date of Patent: Apr. 3, 2012

(54) SUBSTRATE WITH A STACK HAVING THERMAL PROPERTIES

(75) Inventors: Laurent LaBrousse, Saint Prim (FR); Eric Petitjean, Les Lilas (FR)

(73) Assignee: Saint-Gobain Glass France, Courbevoie (FR)

( * ) Notice: Subject to any disclaimer, the term of this patent is extended or adjusted under 35 U.S.C. 154(b) by 1041 days.

(21) Appl. No.: 11/579,510

(22) PCT Filed: Apr. 27, 2005

(86) PCT No.: PCT/FR2005/050282
§ 371 (c)(1),
(2), (4) Date: Nov. 3, 2006

(87) PCT Pub. No.: WO2005/110939
PCT Pub. Date: Nov. 24, 2005

(65) Prior Publication Data
US 2007/0204949 A1    Sep. 6, 2007

(30) Foreign Application Priority Data
May 5, 2004 (FR) ..................................... 04 04804

(51) Int. Cl.
*B32B 9/00* (2006.01)
*C23C 16/00* (2006.01)

(52) U.S. Cl. ........ 428/426; 428/428; 428/432; 428/433; 427/255.11; 427/255.19

(58) Field of Classification Search .................. 428/432, 428/469, 698, 701
See application file for complete search history.

(56) References Cited

U.S. PATENT DOCUMENTS

| 6,020,077 A | 2/2000 | Schicht et al. |
| 6,045,896 A * | 4/2000 | Boire et al. ................... 428/216 |
| 2001/0053439 A1 | 12/2001 | Guiselin et al. |
| 2003/0104221 A1* | 6/2003 | Stachowiak ................... 428/432 |
| 2003/0148115 A1 | 8/2003 | Glenn et al. |
| 2004/0005467 A1* | 1/2004 | Neuman et al. ............... 428/432 |
| 2004/0101694 A1 | 5/2004 | Lingle et al. |

FOREIGN PATENT DOCUMENTS

FR    2 708 926    2/1995

* cited by examiner

*Primary Examiner* — Timothy Speer
(74) *Attorney, Agent, or Firm* — Oblon, Spivak, McClelland, Maier & Neustadt, L.L.P.

(57) ABSTRACT

The invention relates to a substrate (1) provided with a thin-film multilayer comprising an alternation of n functional layers (3) having reflection properties in the infrared and/or in solar radiation, and (n+1) coatings (2, 5), where n≧1, said coatings being composed of a layer or a plurality of layers (2a, 2b, 5a, 5b), characterized in that, in order to preserve the optical and/or mechanical quality of the multilayer in the case in which the substrate (1) provided with said multilayer is subjected to a heat treatment of the toughening, bending or annealing type, at least one of the functional layers (3) includes a blocker coating (4) consisting of:

on the one hand, a "protection" layer made of a material capable of helping to protect the functional layer from oxidizing and/or nitriding attack, immediately in contact with said functional layer; and on the other hand, at least one "adhesion" layer made of a material capable of promoting adhesion, immediately in contact with said "protection" layer.

18 Claims, 1 Drawing Sheet

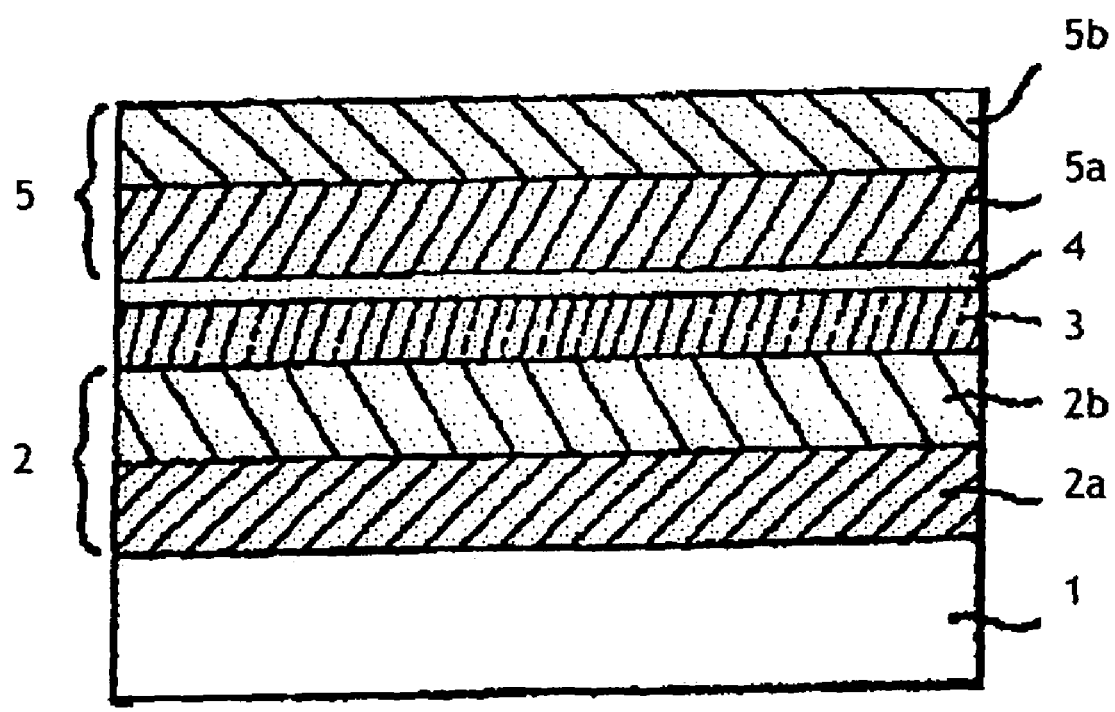

SUBSTRATE WITH A STACK HAVING THERMAL PROPERTIES

The invention relates to transparent substrates, especially those made of a rigid mineral material such as glass, said substrates being coated with a thin-film multilayer comprising at least one functional layer of metallic type which can act on solar radiation and/or infrared radiation of long wavelength.

The invention relates more particularly to the use of such substrates for manufacturing thermal insulation and/or solar protection glazing units. These glazing units are intended for equipping both buildings and vehicles, especially with a view to reducing air-conditioning load and/or reducing excessive overheating (glazing called "solar control" glazing) and/or reducing the amount of energy dissipated to the outside (glazing called "low-e" or "low-emissivity" glazing) brought about by the ever growing use of glazed surfaces in buildings and vehicle passenger compartments.

One type of multilayer known for giving substrates such properties consists of at least one metal layer, such as a silver layer, which is placed between two coatings made of dielectric material of the metal oxide type. This multilayer is generally obtained by a succession of deposition operations carried out using a vacuum technique, such as sputtering, possibly magnetically enhanced sputtering. Two very thin metal layers may also be provided, these being placed on each side of the silver layer—the subjacent layer as a tie, nucleation and/or protection layer, for protection during a possible heat treatment subsequent to the deposition, and the overlayer as a "sacrificial" or protection layer so as to prevent the silver from being impaired if the oxide layer that surmounts it is deposited by sputtering in the presence of oxygen and/or if the multilayer undergoes a heat treatment subsequent to the deposition.

Thus, multilayers of this type, with one or two silver-based layers, are known from European patents EP-0 611 213, EP-0 678 484 and EP-0 638 528.

Currently, there is an increasing demand for this low-emissivity or solar-protection glazing to also have characteristics inherent in the substrates themselves, especially esthetic characteristics (for the glazing to be able to be curved), mechanical properties (to be stronger) or safety characteristics (to cause no injury by broken fragments). This requires the glass substrates to undergo heat treatments known per se, of the bending, annealing or toughening type, and/or treatments associated with the production of laminated glazing.

The multilayer then has to be adapted in order to preserve the integrity of the functional layers of the silver-layer type, especially to prevent their impairment. A first solution consists in significantly increasing the thickness of the above-mentioned thin metal layers that surround the functional layers: thus, measures are taken to ensure that any oxygen liable to diffuse from the ambient atmosphere and/or to migrate from the glass substrate at high temperature is "captured" by these metal layers, which oxidizes them, without it reaching the functional layer(s).

These layers are sometimes called "blocking layers" or "blocker layers".

The reader may especially refer to patent application EP-A-0 506 507 for the description of a "toughenable" multilayer having a silver layer placed between a tin layer and a nickel-chromium layer. However, it is clear that the substrate coated before the heat treatment was considered merely as a "semi-finished" product—the optical characteristics frequently rendered it unusable as it was. It was therefore necessary to develop and manufacture, in parallel, two types of multilayer, one for noncurved "nontoughened" glazing and the other for glazing intended to be toughened or curved, which may be complicated, especially in terms of stock management and production.

An improvement proposed in patent EP-0 718 250 has allowed this constraint to be overcome, the teaching of that document consisting in devising a thin-film multilayer such that its optical and thermal properties remain virtually unchanged, whether or not the substrate once coated with the multilayer undergoes a heat treatment. Such a result is achieved by combining two characteristics:

- on the one hand, a layer made of a material capable of acting as a barrier to high-temperature oxygen diffusion is provided on top of the functional layer(s), which material itself does not undergo, at high temperature, a chemical or structural change that would modify its optical properties. Thus, the material may be silicon nitride $Si_3N_4$ or aluminum nitride AlN; and
- on the other hand, the functional layer(s) is (are) directly in contact with the subjacent dielectric, especially zinc oxide (ZnO), coating.

A single blocker layer (or monolayer blocker coating) is also, preferably, provided on the functional layer or layers. This blocker layer is based on a metal chosen from niobium Nb, tantalum Ta, titanium Ti, chromium Cr and nickel Ni or from an alloy based on at least two of these metals, especially a niobium/tantalum (Nb/Ta) alloy, a niobium/chromium (Nb/Cr) alloy or a tantalum/chromium (Ta/Cr) alloy or a nickel/chromium (Ni/Cr) alloy.

Although this solution does actually allow the substrate after heat treatment to preserve a $T_L$ level and an appearance in external reflection that are quite constant, it is still capable of improvement.

This is because the monolayer blocker coatings (the layer comprising one or more constituents) are not devoid of drawbacks:

- the Ti-based metal layers cause, for the most part, problems regarding the mechanical integrity of the multilayer, especially after heat treatment; scratches may be produced, in particular during transportation between the site where the multilayer is deposited on the substrate and the site where this substrate is integrated into a glazing unit, especially a multiple glazing unit (double glazing, laminated glazing, etc.); and
- the Ni-based metal layers cause, for the most part, problems of optical defects appearing during or after the heat treatment.

The object of the invention is therefore to remedy the drawbacks of the prior art, by developing a novel type of multilayer comprising one or more functional layers of the type of those described above, which multilayer can undergo high-temperature heat treatments of the bending, toughening or annealing type while preserving its optical quality and its mechanical integrity.

Thus, the subject of the invention, in its broadest acceptance, is a substrate as in claim 1. This substrate, especially a transparent glass substrate, is provided with a thin-film multilayer comprising an alternation of n functional layers having reflection properties in the infrared and/or in solar radiation, especially metallic functional layers based on silver or on a metal alloy containing silver, and (n+1) coatings, where $n \geq 1$, said coatings being composed of a layer or a plurality of layers, including at least one made of a dielectric material, so that each functional layer is placed between at least two coatings. In order to preserve the optical and/or mechanical quality of the multilayer in the case in which the substrate provided with said multilayer is subjected to a heat treatment of the toughening, bending or annealing type, at least one of the functional layers includes a blocker coating consisting of:

on the one hand, a "protection" layer made of a material capable of helping to protect the functional layer from oxidizing and/or nitriding attack, immediately in contact with said functional layer; and on the other hand, at least one "adhesion" layer made of a material capable of promoting adhesion, immediately in contact with said "protection" layer.

The invention consists in providing a blocker coating comprising at least a bilayer, for the functional layer of the silver-based type.

It is important to continue to provide in direct contact with the functional layer at least one "protection" layer made of a material capable of helping to protect the functional layer from oxidizing and/or nitriding attack, immediately in contact with said functional layer. This prevents any chemical or morphological modification (dewetting) of the functional layer, especially by oxidation/nitriding, which would reduce the thermal performance of the functional layer and would jeopardize its optical quality, this degradation phenomenon being uncontrollable.

The, or at least one, constituent material of the "protection" layer thus has, preferably, a strong affinity for the element oxygen and/or nitrogen and/or for water.

The invention adds, to this first protection within the blocker coating, at least one reinforcement or "adhesion" layer made of a material capable of promoting adhesion of the blocker coating to the adjacent layers and especially the functional layer, and surprisingly capable of doing so through the protection layer.

The place of the blocker coating (comprising at least a bilayer) in the multilayer may vary, as it can be deposited under and/or on the functional layer, but the protection layer is always in direct contact with the functional layer, to avoid there being any risk of creating optical defects, especially by the formation of "clusters" of material of the functional layer, especially silver clusters, or any risk of oxygen or nitrogen diffusing into the functional layer.

The invention does not only apply to multilayers comprising a single "functional" layer placed between two coatings. It also applies to multilayers having a plurality of functional layers, especially two functional layers alternating with three coatings, or three functional layers alternating with four coatings, or even four functional layers alternating with five coatings.

In the case of a multilayer having multiple functional layers, at least one functional layer, and preferably each functional layer, is provided with an underblocker coating and/or with an overblocker coating according to the invention, that is to say a blocker coating comprising at least two separate layers.

The functional layer, and preferably each functional layer, is preferably metallic in nature, made of silver or a metal alloy containing silver.

In fact, the protection layer is to be chosen such that it has, preferably, at least one of the following two properties: it is important, on the one hand, for the material of which it is made to have good wetting with the material of the functional layer and/or, on the other hand, for the material of the protection layer also to have a strong affinity for the disturbing elements (oxygen and/or nitrogen and/or water vapor) that diffuse during the heat treatment.

It has been found that one particularly advantageous material for forming this protection layer is essentially metallic, especially made of a material chosen from at least one of the following metals: Ti, Zr, Hf, Al, Nb or an alloy based on at least one of these materials.

The position in the multilayer and the nature of the adhesion layer will now be discussed.

The "adhesion" layer is preferably based on Ni or on an Ni-based alloy. The "adhesion" layer may especially be based on an NiCr alloy. It may also be in the form of an NiY alloy, where Y may be a metal, such as for example Ti, Zr, Al, Nb, Hf, etc.

This "adhesion" layer may be partially oxidized.

The "adhesion" layer preferably has a thickness at least as great as that of the "protection" layer and preferably has a thickness greater than that of the "protection" layer.

The "adhesion" layer preferably has a geometric thickness of less than 5 nm and more preferably between 0.5 and 2 nm and the "protection" layer preferably has a geometric thickness of less than 5 nm and more preferably between 0.5 and 2 nm.

The glazing according to the invention incorporates at least the substrate carrying the multilayer according to the invention, optionally combined with at least one other substrate. Each substrate may be clear or tinted. At least one of the substrates may especially be made of bulk-tinted glass. The choice of coloration type will depend on the level of light transmission and/or on the colorimetric appearance that are desired for the glazing once its manufacture has been completed.

Thus, for glazing intended to equip vehicles, standards impose that windshields have a light transmission $T_L$ of about 75%, such a level of transmission not being required for the side windows or a sunroof for example. The tinted glass that can be used is for example that, for a thickness of 4 mm, having a $T_L$ of 65% to 95%, an energy transmission $T_E$ of 40% to 80%, a dominant wavelength in transmission of 470 nm to 525 nm, associated with a transmission purity of 0.4% to 6% under illuminant $D_{65}$, which may "result", in the (L,a*,b*) colorimetry system, in a* and b* values in transmission of between −9 and 0 and between −8 and +2, respectively.

For glazing intended to equip buildings, it preferably has a light transmission $T_L$ of at least 75% or higher in the case of "low-emissivity" applications, and a light transmission $T_L$ of at least 40% or higher for "solar control" applications.

The glazing according to the invention may have a laminated structure, especially one combining at least two rigid substrates of the glass type with at least one sheet of thermoplastic polymer, so as to have a structure of the type: glass/thin-film multilayer/sheet(s)/glass. The polymer may especially be based on polyvinyl butyral (PVB), ethylene/vinyl acetate (EVA), polyethylene terephthalate (PET) or polyvinyl chloride (PVC).

The glazing may also have what is called an asymmetric laminated glazing structure, which combines a rigid structure of the glass type with at least one sheet of polymer of the polyurethane type having energy-absorbing properties, optionally combined with another layer of polymers having "self-healing" properties. For further details about this type of glazing, the reader may refer especially to patents EP-0 132 198, EP-0 131 523 and EP-0 389 354. The glazing may therefore have a structure of the type: glass/thin-film multilayer/polymer sheet(s).

In a laminated structure, the substrate carrying the multilayer is preferably in contact with a sheet of polymer.

The glazing according to the invention is capable of undergoing a heat treatment without damaging the thin-film multilayer. The glazing is therefore possibly curved and/or toughened.

The glazing may be curved and/or toughened when consisting of a single substrate, that provided with the multilayer. Such glazing is then referred to as "monolithic" glazing. When it is curved, especially for the purpose of making windows for vehicles, the thin-film multilayer preferably is on an at least partly nonplanar face.

The glazing may also be a multiple glazing unit, especially a double-glazing unit, at least the substrate carrying the multilayer being curved and/or toughened. It is preferable in a multiple glazing configuration for the multilayer to be placed so as to face the intermediate gas-filled space.

When the glazing is monolithic or is in the form of multiple glazing of the double-glazing or laminated glazing type, at least the substrate carrying the multilayer may be made of curved or toughened glass, it being possible for the substrate to be curved or toughened before or after the multilayer has been deposited.

The invention also relates to a process for manufacturing substrates according to the invention, which consists in depositing the thin-film multilayer on its substrate by a vacuum technique of the sputtering, optionally magnetically enhanced sputtering, type and then in carrying out a heat treatment of the bending, toughening or annealing type on the coated substrate without degrading its optical and/or mechanical quality.

However, it is not excluded for the first layer or first layers to be able to be deposited by another technique, for example by a thermal decomposition technique of the pyrolysis or CVD type.

In a preferred version of this process, each layer of the blocker coating is deposited by sputtering using a target having a composition different from the target used for depositing at least the adjacent layer of the blocker coating.

The details and advantageous features of the invention will become apparent from the following nonlimiting examples, illustrated by means of figure.

FIG. 1 shows a multilayer with a functional monolayer, but the proportions between the thicknesses of the various materials have not been drawn to scale so as to make the figure easier to examine.

In Examples 1 to 4 that follow, the multilayer is deposited on the substrate 1, which is a substrate made of clear soda-lime-silica glass 4 mm in thickness. The multilayer includes a single silver-based functional layer 3 on which a thin blocker coating 4 is placed.

Beneath the functional layer 3 is a coating 2 consisting of a plurality of superposed layers based on dielectric materials, with the references 2a and 2b, and on the functional layer 3, and above the blocker coating 4, there is a coating 5 consisting of a plurality of superposed layers based on dielectric materials, with the references 5a and 5b.

In Examples 1 to 4:
the layers 2a are made of $Si_3N_4$;
the layers 2b are made of ZnO;
the layers 5a are made of ZnO;
the layers 5b are made of $Si_3N_4$;
the layers 3 are made of silver,
and the layers have the same thicknesses.

In the various Examples 1 to 4, only the nature and the thickness of the blocker coating 4 change.

In all these examples, the successive operations of depositing the layers of the multilayer were carried out by magnetically enhanced sputtering, but any other deposition technique could have been envisaged provided that it allows good control of the thicknesses of the layers to be deposited.

The deposition installation comprised at least one sputtering chamber provided with cathodes equipped with targets made of appropriate materials, beneath which the substrate 1 passes in succession. The deposition conditions for each of the layers were the following:

the silver-based layers 3 were deposited using a silver target, at a pressure of 0.8 Pa in an argon atmosphere;

the ZnO-based layers 2b and 5a were deposited by reactive sputtering using a zinc target, at a pressure of 0.3 Pa and in an argon-oxygen atmosphere; and the $Si_3N_4$-based layers 2a and 5b were deposited by reactive sputtering using a boron-doped or aluminum-doped silicon target, at a pressure of 0.8 Pa in an argon/nitrogen atmosphere.

The power densities and the run speeds of the substrate 1 were adjusted in a known manner so as to obtain the desired layer thicknesses.

EXAMPLE 1

In this example, the coating 4 was a Ti monolayer and was obtained by reactive sputtering with a Ti target at a pressure of 0.8 Pa in an atmosphere of pure argon.

EXAMPLE 2

In this example according to the invention, the coating 4 was a bilayer and consisted of a titanium first layer deposited under the same conditions as those of Example 1, followed by a second layer made of nickel/chromium alloy obtained by sputtering with an NiCr target in an atmosphere of pure argon.

To manufacture this blocker coating, two targets having different compositions were used, these two targets being located in two different compartments of one and the same airlock of a sputtering installation.

EXAMPLE 3

In this example according to the invention, the coating 4 was also a bilayer and consisted of a titanium first layer deposited under the same conditions as those of Example 1, followed by a second layer made of a nickel/chromium alloy obtained by reactive sputtering, but in this example the atmosphere consisted of argon and oxygen, the amount of argon being adjusted in order to greatly reduce the absorption compared with the coating deposited in Example 2.

To manufacture this blocker coating, two targets having different compositions were used, these two targets being located in two different airlocks of the same sputtering installation, the two airlocks being separated by a port so as to prevent oxygen from penetrating into the first airlock.

EXAMPLE 4

In this example, the coating 4 was a bilayer, but the reverse of that of Example 3. It consisted of a nickel/chromium alloy first layer deposited under the same conditions as those of Example 3, followed by a titanium second layer deposited under the same conditions as those of Example 3.

Table 1 below gives the thicknesses of the various layers in nm.

TABLE 1

|  |  | Example 1 | Example 2 | Example 3 | Example 4 |
|---|---|---|---|---|---|
| Glass | (1) | — | — | — | — |
| $Si_3N_4$ | (2a) | 30 | 30 | 30 | 30 |
| Zno | (2b) | 10 | 10 | 10 | 10 |
| Ag | (3) | 10 | 10 | 10 | 10 |
|  | (4) | (Ti): 1 | (Ti/NiCr): 1 + 1 | (Ti/NiCrO$_x$): 1 + 1 | (NiCrO$_x$/Ti): 1 + 1 |
| Zno | (5a) | 20 | 20 | 20 | 20 |
| $Si_3N_4$ | (5b) | 20 | 20 | 20 | 20 |

Each of these coated substrates was then cut into three parts, the first two parts each undergoing a different mechanical strength test before being annealed at above 620° C., and the third part being directly annealed at above 620° C.

Table 2 below indicates, for each of Examples 1 to 3:
the light transmission values $T_L$ in % (illuminant $D_{65}$):
  $T_{Lb}$, before the heat treatment and the mechanical test in the case of the first part and the second part of the substrate, and
  $T_{La}$, after the heat treatment, in the case of the third part of the substrate;
the amounts of multilayer remaining, Q, as a % of the area remaining after a Taber test carried out with a 500 g load for 50 revolutions; and
the value V, in newtons, of the force needed to make a scratch in the multilayer during the execution of an Erichsen scratch test (van Laar tip or steel ball).

TABLE 2

|  | $T_{Lb}$ | $T_{La}$ | Q | V |
| --- | --- | --- | --- | --- |
| Example 1 | 82.5 | 87.2 | 0 | 0.5 |
| Example 2 | 81.9 | 86.3 | 63.4 | 10 |
| Example 3 | 85.3 | 86.8 | 55 | 3 |

Furthermore, it should be pointed out that the scratch formed before the annealing by the Erichsen test on the substrate of Example 1 was highly corroded during the heat treatment, whereas the scratch formed before the annealing by the Erichsen test on the substrates of Examples 2 and 3 was hardly corroded at all during the heat treatment.

The following conclusions may be drawn from these results:

By using a Ti/NiCr bilayer blocker coating it is possible to improve the mechanical integrity of the multilayer compared with a single Ti blocker coating.

By using a Ti/oxidized NiCr blocker coating it is possible to maintain an acceptable mechanical integrity (albeit slightly inferior to that using Ti/NiCr in which the NiCr is unoxidized), but it does make it possible to reduce optical changes as a result of the heat treatment (the change in light transmission is in this case only +1.5%).

As regards Example 4, produced in order to test the inversion of the adhesion and protection layers of Example 3 in an overblocker coating, it should be pointed out that the fact of inverting these layers resulted in very substantial deterioration of the multilayer as a result of the heat treatment (appearance of macroscopic corrosion spots, considerable red haze, deterioration in the silver layer, resulting in an increased resistance per square, etc.). This solution does not withstand the toughening process and therefore cannot be envisaged.

Examples with several functional layers were also produced. They gave the same conclusions.

The present invention has been described in the foregoing text by way of example. Of course, a person skilled in the art is capable of producing various alternative forms of the invention without thereby departing from the scope of the patent as defined by the claims.

The invention claimed is:

1. A substrate provided with a thin-film multilayer comprising an alternation of n functional layers having reflection properties in the infrared and/or in solar radiation, and (n+1) coatings, where n ≧1, said coatings comprising a layer or a plurality of layers, including at least one made of a dielectric material, so that each functional layer is placed between at least two coatings, wherein, in order to preserve the optical and/or mechanical quality of the multilayer in the case in which the substrate provided with said multilayer is subjected to a heat treatment of the toughening, bending or annealing type, at least one of the functional layers includes a blocker coating consisting of:
  a protection layer comprising a metal selected from the group consisting of Ti, Zr, Al, and Nb, or an alloy comprising at least one of said metals, immediately in contact with said functional layer; and
  at least one adhesion layer based on a NiY alloy, where Y is at least one selected from the group consisting of Cr, Ti, Zr, Al, Nb and Hf, immediately in contact with said protection layer and with said dielectric material.

2. The substrate as claimed in claim 1, wherein the multilayer comprises two functional layers alternating with three coatings.

3. The substrate as claimed in claim 1, wherein the protection layer is essentially metallic.

4. The substrate as claimed in claim 1, wherein the adhesion layer is based on an NiCr alloy.

5. The substrate as claimed in claim 1, wherein the adhesion layer is partially oxidized.

6. The substrate as claimed in claim 1, wherein the adhesion layer has a thickness at least as great as that of the protection layer.

7. The substrate as claimed in claim 1, wherein the adhesion layer has a geometric thickness of less than 5 nm.

8. The substrate as claimed in claim 1, wherein the protection layer has a geometric thickness of less than 5 nm.

9. A glazing unit incorporating at least one substrate as claimed in claim 1, optionally combined with at least one other substrate.

10. The glazing unit as claimed in claim 9, mounted in monolithic form or as multiple glazing of the double-glazing or laminated glazing type, wherein at least the substrate carrying the multilayer is made of curved or toughened glass.

11. The substrate as claimed in claim 1, wherein the substrate is a transparent glass substrate.

12. The substrate as claimed in claim 1, wherein the thin-film multilayer comprises at least two metallic functional layers based on silver or on a metal alloy containing silver.

13. The substrate as claimed in claim 1, wherein the protection layer is made of a material selected from the group consisting of Ti, Zr, Nb, an alloy based on at least one of these materials, and mixtures thereof.

14. The substrate as claimed in claim 1, wherein the adhesion layer has a thickness greater than that of the protection layer.

15. The substrate as claimed in claim 1, wherein the adhesion layer has a geometric thickness between 0.5 and 2 nm.

16. The substrate as claimed in claim 1, wherein the protection layer has a geometric thickness between 0.5 and 2 nm.

17. A process for manufacturing the substrate as claimed in claim 1, wherein the thin-film multilayer is deposited on the substrate by a vacuum technique of the sputtering, optionally magnetically enhanced sputtering, type and then in that a heat treatment of the bending, toughening or annealing type is carried out on said substrate without degrading its optical and/or mechanical quality.

18. The process as claimed in claim 17, wherein each blocker coating layer is deposited by sputtering using a target having a composition different from the target used for depositing at least the adjacent layer.

* * * * *